United States Patent
Löhr

(10) Patent No.: US 7,394,759 B2
(45) Date of Patent: Jul. 1, 2008

(54) METHOD OF NEGOTIATING AN ACTIVE OR A PASSIVE ROLE ASSIGNMENT TO A CONTROL MEANS OF A NETWORK ELEMENT, A CONTROL MEANS, A PROGRAM MODULE AND A NETWORK ELEMENT THEREFOR

(75) Inventor: Jürgen Löhr, Stuttgart (DE)

(73) Assignee: Alcatel, Paris (FR)

( * ) Notice: Subject to any disclaimer, the term of this patent is extended or adjusted under 35 U.S.C. 154(b) by 1009 days.

(21) Appl. No.: 10/348,949

(22) Filed: Jan. 23, 2003

(65) Prior Publication Data

US 2003/0152026 A1  Aug. 14, 2003

(30) Foreign Application Priority Data

Feb. 12, 2002  (EP) .................................. 02360061

(51) Int. Cl.
*H04L 1/22* (2006.01)
(52) U.S. Cl. ........................ 370/220; 370/252
(58) Field of Classification Search ................. 370/221, 370/252, 220
See application file for complete search history.

(56) References Cited

U.S. PATENT DOCUMENTS

| | | | | |
|---|---|---|---|---|
| 4,276,451 A | * | 6/1981 | Beebe et al. .............. | 379/15.05 |
| 4,445,180 A | * | 4/1984 | Davis et al. ................ | 700/289 |
| 5,365,523 A | * | 11/1994 | Derby et al. .............. | 370/402 |
| 5,491,531 A | * | 2/1996 | Adams et al. ............. | 375/354 |
| 5,526,358 A | * | 6/1996 | Gregerson et al. ........ | 709/221 |
| 5,612,957 A | * | 3/1997 | Gregerson et al. ........ | 370/401 |
| 6,574,477 B1 | * | 6/2003 | Rathunde .................. | 455/453 |
| 6,914,879 B1 | * | 7/2005 | Kleine-Altekamp et al. | 370/219 |
| 2001/0036173 A1 | * | 11/2001 | Shmulevich et al. ....... | 370/352 |
| 2002/0099972 A1 | * | 7/2002 | Walsh et al. .............. | 714/10 |
| 2003/0149735 A1 | * | 8/2003 | Stark et al. ............... | 709/208 |

FOREIGN PATENT DOCUMENTS

DE   4005321 A1   8/1991
GB   2308040 A    6/1997

OTHER PUBLICATIONS

Patent Abstracts of Japan, vol. 1996, No. 06, Jun. 28, 1996 corresponding to JP 08036502 A (Fujitsu Ltd) dated Feb. 6, 1996.

* cited by examiner

*Primary Examiner*—Kwang Bin Yao
*Assistant Examiner*—Andrew Lai
(74) *Attorney, Agent, or Firm*—Sughrue Mion, PLLC

(57) ABSTRACT

The present invention relates to a method of negotiating an active or a passive role assignment to a first and a second control means of a network element. The control means are redundant and operate dependent on their respective active or passive role. The invention furthermore relates to a control means therefor, a program module for a control means therefor and a network element therefor.

The method comprises the steps of:
  determining an operability state parameter for each of said control means dependent on their respective ability to perform their respective functionality;
  mutually transmitting said operability state parameters between said control means; and
  determining an active role or a passive role by said control means dependent on said respective operability state parameters.

24 Claims, 4 Drawing Sheets

METHOD OF NEGOTIATING AN ACTIVE OR A PASSIVE ROLE ASSIGNMENT TO A CONTROL MEANS OF A NETWORK ELEMENT, A CONTROL MEANS, A PROGRAM MODULE AND A NETWORK ELEMENT THEREFOR

The invention is based on a priority application EP 02 360 061.2 which is hereby incorporated by reference.

FIELD OF THE INVENTION

The present invention relates to a method of negotiating an active or a passive role assignment to a first and to at least one second control means of a network element, the first and the at least one second control means being redundant and operating dependent on their respective active or passive role. The invention furthermore relates to a control means therefor, a program module for a control means therefor and a network element comprising a first control means and at least one second control means therefor.

BACKGROUND OF THE INVENTION

A network element in a communication network, e.g. a cross-connect equipment in a synchronous digital hierarchy (SDH) network or a switching center in a switched telecommunications network, has to be high reliable. Thus, some components, hardware and/or software components, of such network elements are redundant. For example central processing units (CPU), hardware controller or other control means of a cross-connect equipment are usually redundant. If for example a first and a second controller alternatively may control a predetermined hardware equipment, the first controller may play an active role whereas the second controller may play a passive role or vice versa. Only the active controller controls actively the hardware equipment, the passive controller is in a stand-by mode concerning the hardware to be controlled. The passive controller may however perform other functionalities in the passive/stand-by mode. The respective active role or passive role has to be assigned to the first and the second controller in order to avoid active-active or passive-passive conflicts between the first and the second controller. In an active-active conflict both controllers intend to control the hardware, in a passive-passive conflict none of both is responsible for the hardware.

It is known that a superordinated third controller coordinates the respective active role and the passive role of the first and the second controller. The third controller assigns the active role to the first and the passive role to the second controller or vice versa. It is however expensive to provide a superordinated controller. Furthermore, the superordinated controller is an additional source of error. In the case of, e.g., a malfunction of the superordinated controller or of a disturbed communication between the superordinated and the subordinated controllers, the active and passive roles cannot be properly assigned to the subordinated redundant controllers.

SUMMARY OF THE INVENTION

Accordingly one object of the invention is to provide a reliable method of negotiating an active or a passive role assignment to a first and to at least one second control means of a network element. Further objects of the invention are to provide an appropriate control means, an appropriate program module for a control means and an appropriate network element.

This objects are to be attained by a method in accordance with the technical principle of claim 1, a control means, a program module for a control means therefor and a network element therefor, said control means, said program module and said network element being in accordance with technical principles of further independent claims.

In this respect one principle of the invention is that two or more redundant control means interactively negotiate their respective active or passive role. The control means, for example central processing units (CPU) or, preferably, hardware controllers, determine their respective operability state parameter. The operability state parameters for a control means depend on its respective ability to perform its functionality. The control means mutually transmit their operability state parameters. Usually—except for, e.g., transmission problems and/or a malfunction of a control means—each of the control means is informed about the operability states of the other redundant control means. Based on this information the control means determine their respective active or passive role dependent on said operability state parameters. A typical result of the above negotiation is, that one control means plays the active role whereas one or more further control means play a passive role. However, other scenarios are possible wherein for example two control means play an active role whereas one or more control means are in a passive role, e.g. in a stand-by or hot stand-by mode.

A control means according to the invention can execute the method according to the invention. The control means may contain hardware and/or software means to carry out steps of the method. The control means may for example run a program module according to the invention. A network element according to the invention, e.g. a cross-connect system or any other telecommunication equipment of a synchronous digital hierarchy (SDH), a synchronous optical network (SONET), an optical transport hierarchy (OTH) or the like, a (call-level) circuit switch of a switched network, a router of a routed network or the like, may contain two or more control means mentioned above. A network element according to the invention may also contain two or more disjoint groups of control means. The respective control means of one of said groups may negotiate their respective active or passive role assignment independently of the control means of the other groups.

Advantageous further effects of the invention will be seen from the dependent claims and the specification.

A control means assigns preferably an active role to itself if its operability state is better than the operability state of a further, redundant control means. On the other hand, a control means determines a passive role for itself if its operability state is worse than the operability of a further, redundant control means.

To determine its operability state a control means may compare its own operability state parameter with one or more operability state parameters of one or more redundant control means. The operability state parameter may preferably have values of a predetermined order, whereby e.g. a higher value represents a better ability to perform a respective functionality as a lower value. The control means may compare the values in order to determine whether to play an active role or a passive role.

Basically two operability states are sufficient: Fully functional and not operational. It is however preferred to provide more than two operability states: the more different values an operability state parameter may have, the finer is the granularity of assessing the operability state of a control means.

In a preferred embodiment of the invention, a unique identifier, for example a so-called tag, is assigned to each of the control means. The unique identifiers are mutually transmitted between the control means. The identifiers may for example be used to identify the mutually transmitted operability state parameters.

The identifiers, especially its respective values, may be also used to determine the active and passive roles for the redundant control means: two or more control means may have the same operability state. In such a scenario, when a so-called active-active role conflict or a so-called passive-passive role conflict occurs, the control means having an identifier with e.g. the highest or the lowest value may play the active role, the other control means play a passive role.

The communication between the redundant control means may be disturbed, for example due to a broken communication line and/or due to a non-working control means. The control means could be for example partly or totally not operational or currently not existing in the network element, e.g. plugged out. If a control means does not receive the operability state parameter of a redundant "partner" control means, it assumes that the redundant partner control means plays a passive role and assigns consequently an active role to itself.

It is preferred, that the redundant control means mutually transmit information about their respective roles. It has however to be noted, that it is also possible that the control means only mutually transmit their operability state parameters.

The initial role of the redundant control means at their respective system start is preferably a role "undetermined". It is however possible, that a control means starts for example with one of the roles passive or active.

A suitable embodiment of the invention provides, that the control means transmit their respective operability state parameter and/or their respective unique identifier and/or their respective information about their role via one common message respectively. One single message may however carry only one or two elements of the aforementioned data, e.g., only a state parameter and a unique identifier or, in another scenario, an operability state parameter and information about the role of a sending control means.

The aforementioned data, the operability state parameter and/or unique identifier and/or information about the role of a control means, are preferably transmitted at the system start of a control means. Preferably, also in the subsequent "normal" operation said data is periodically transmitted. A currently passive control means can, e.g., due to a periodical transmission detect a malfunction/non-function of a redundant, currently active control means. Another embodiment of the invention provides, that a control means forwards said data when a relevant state changes, for example if its operability state and/or its (active-passive-undetermined) role changes. Combinations of the aforementioned conditions for transmission are possible.

A suitable embodiment of the invention provides to use finite state machines (FSM): in connection with the operability states and/or in connection with the roles (active—passive—undetermined). The states of the finite state machines may represent the operability states or the roles of the respective control means respectively.

The finite state machine(s) consist of a set of states (preferably including an initial state), a set of input events, a set of output events and a state transition function. The function takes the current state and an input event and returns the new set of output events and the next state. A FSM according to the invention may be a deterministic FSM where the next state is uniquely determined by a single input event. Also a non-deterministic FSM is possible having several next states for a given input event. It has however to be noted that a non-deterministic FSM may be translated, e.g. automatically by means of a computer program, into a deterministic one that will produce the same output given the same input.

A control means according to the invention is preferably suited to control a hardware device, is a so-called controller. More preferably two or more controllers together are responsible for at least one common hardware device. For example two controller commonly control one or more modules of a rack. Only one of the controllers actively controls the functions of the rack module(s); the other controller(s) is or are passive. The passive controller(s) may however perform other functionalities in the passive/stand-by mode.

The following description will serve to explain the advantages of the invention on the basis of working examples as illustrated in the accompanying drawings.

DETAILED DESCRIPTION OF PREFERRED EMBODIMENTS

Reference will now be made in detail to the present preferred embodiments of the invention as illustrated in the accompanying drawings. In describing the preferred embodiments and applications of the present invention, specific terminology is employed for the sake of clarity. However, the invention is not intended to be limited to the specific terminology so selected, and it is understood that each specific element includes all technical equivalents that operate in a similar manner to accomplish a similar purpose.

Figure 1:
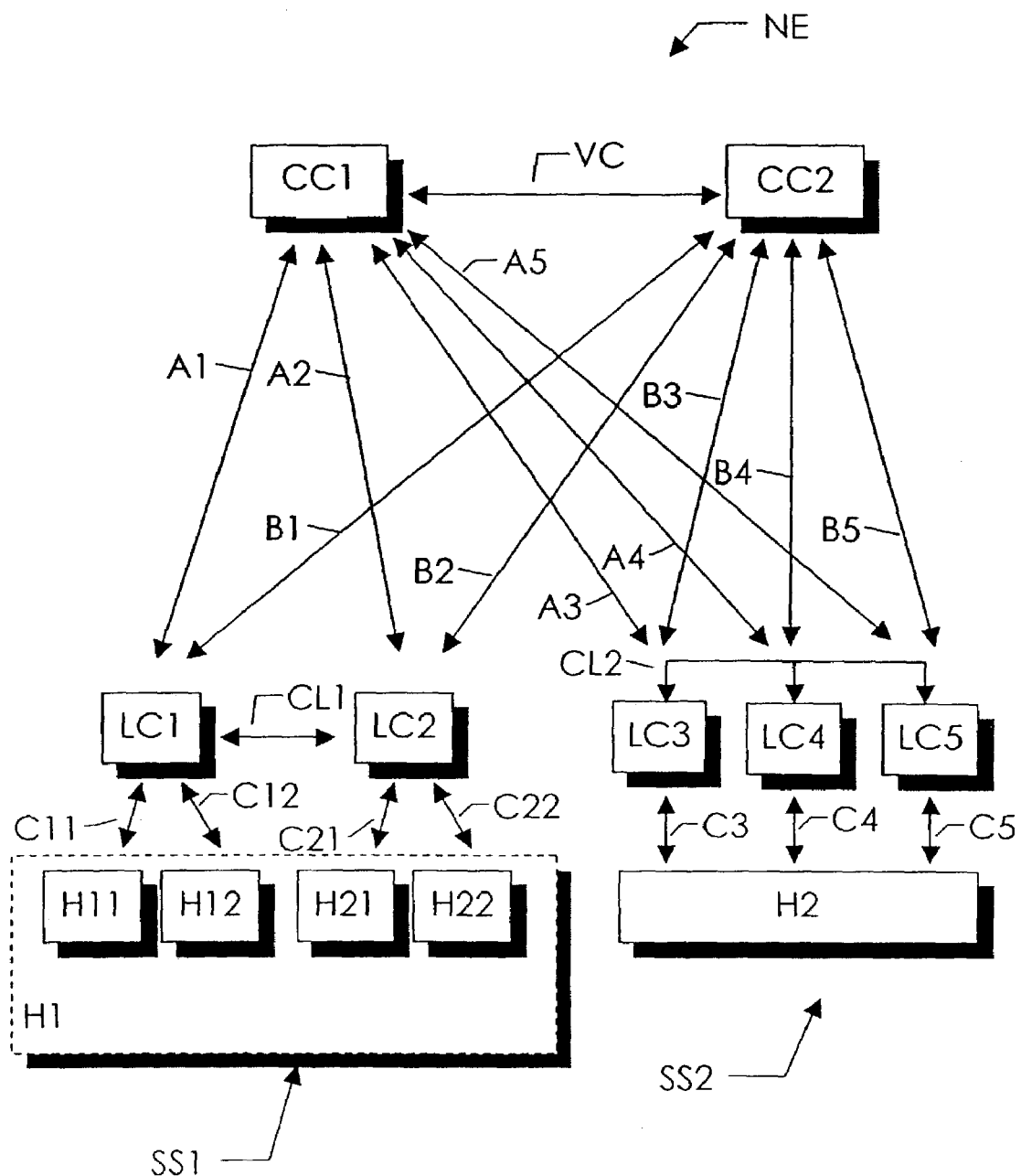
FIG. 1 shows a network element NE according to the invention containing controllers CC1, CC2, LC1 to LC5 for the performance of the method in accordance with the invention.

FIG. 1 shows a very diagrammatically presented arrangement by way of example, with which the invention may be put into practice. A network element NE contains controllers CC1, CC2, LC1 to LC5. The network element NE is for example a cross-connect equipment in a synchronous digital hierarchy (SDH) network or any other transmission network. The network element NE might however be a switching center of a switched network, a router of a routed network, e.g. an IP router (IP=Internet Protocol), or any other equipment that has to be high reliable. The network element NE might also be an element of a remote control system.

The controllers CC1, CC2, LC1 to LC5 are control means according to the invention. The controllers CC1, CC2 are superordinated controller or central controller controlling and supervising the subordinated controllers LC1, LC2 and LC3 to LC5 via connections A1 to A5 and B1 to B5 respectively. The central controllers CC1, CC2 may control further subordinated controllers (not shown). The central controllers CC1, CC2 are redundant whereby one controller CC1 or CC2 controls actively the subordinated controller LC1 to LC5, is consequently playing an active role, whereas the respective other controller CC1, CC2 is in a standby mode playing a passive role. The central controllers CC1, CC2 negotiate their respective active and passive role via a connection VC. The connection VC and the connections A1 to A5 and B1 to B5 are for example LAN (Local Area Network) connections. The communication on the aforementioned connections may be based on TCP/IP (Transmission Control Protocol/Internet Protocol).

The subordinated controller LC1, LC2 are redundant. They are for example so-called shelf controller controlling the hardware equipment H1 of a shelf SS1. The shelf SS1 may for example represent or contain a switching matrix, a so-called center-stage or a so-called input/output stage, of the network element NE. The controller LC1, LC2 negotiate their active or passive role via a connection CL1. The connection CL1 is for example a PCI-like bus connection (PCI=Peripheral Component Interconnect).

In one embodiment of the invention the controller LCI controls via connections C11, C12 hardware components H11, H12, e.g. switching elements, interface cards or the like, of the hardware equipment H1 and the controller LC2 controls via connections C21, C22 hardware components H21, H22 of the hardware equipment H1. The components H11, H12 are for example pairwise redundant to the components H21, H22. When the controller LC1 is active, it controls actively the components H11, H12. When the controller LC2 is active, it controls the components H21, H22 that are in this case also active.

In a preferred embodiment of the invention however one of the controllers LC1, LC2 actively controls the hardware equipment H1 as a whole. The respective other controller LC1, LC2 is passive and does not influence the components H11, H12, H21, H22. Even the passive controller LC1 or LC2 may however receive data indicating the respective function from the components H11, H12, H21, H22 in order to quickly change in the active role.

The shelf SS1 may contain more or less components than the components H11, H12, H21, H22 and more than two controller LC1, LC2.

The controllers LC1, LC2 and the hardware components H11, H12, H21, H22 are preferably interconnected by a common bus, for example on a back panel of the shelf SS1. The connections CL1, C11, C12, C21, C22 are preferably established on that bus, that is for example a PCI-like bus.

The subordinated controllers LC3 to LC5 control hardware equipment H2 of a shelf SS2 via connections C3 to C5. The hardware equipment H2 contains one or more hardware components, e.g. interface cards, memory arrays or the like. The controller LC3 to LC5 are redundant to each other and negotiate their respective active or passive role to control the hardware equipment H2 via a connection CL2 that is for example a bus connection. As a result of that negotiation one controller LC3, LC4 or LC5 is actively controlling the hardware equipment H2, whereas the respective other controllers LC3, LC4 or LC5 play a passive role.

Other active, active-standby, passive-standby configurations are possible: for example two active controllers LC3, LC4 may jointly control the hardware equipment H2 whereas the respective third controller LC5 is passive.

The controllers LC1 and LC2 and/or LC3, LC4 or LC5 might also be suited to control subordinated software, for example program modules run by the hardware equipments H1 and H2.

Figure 5:
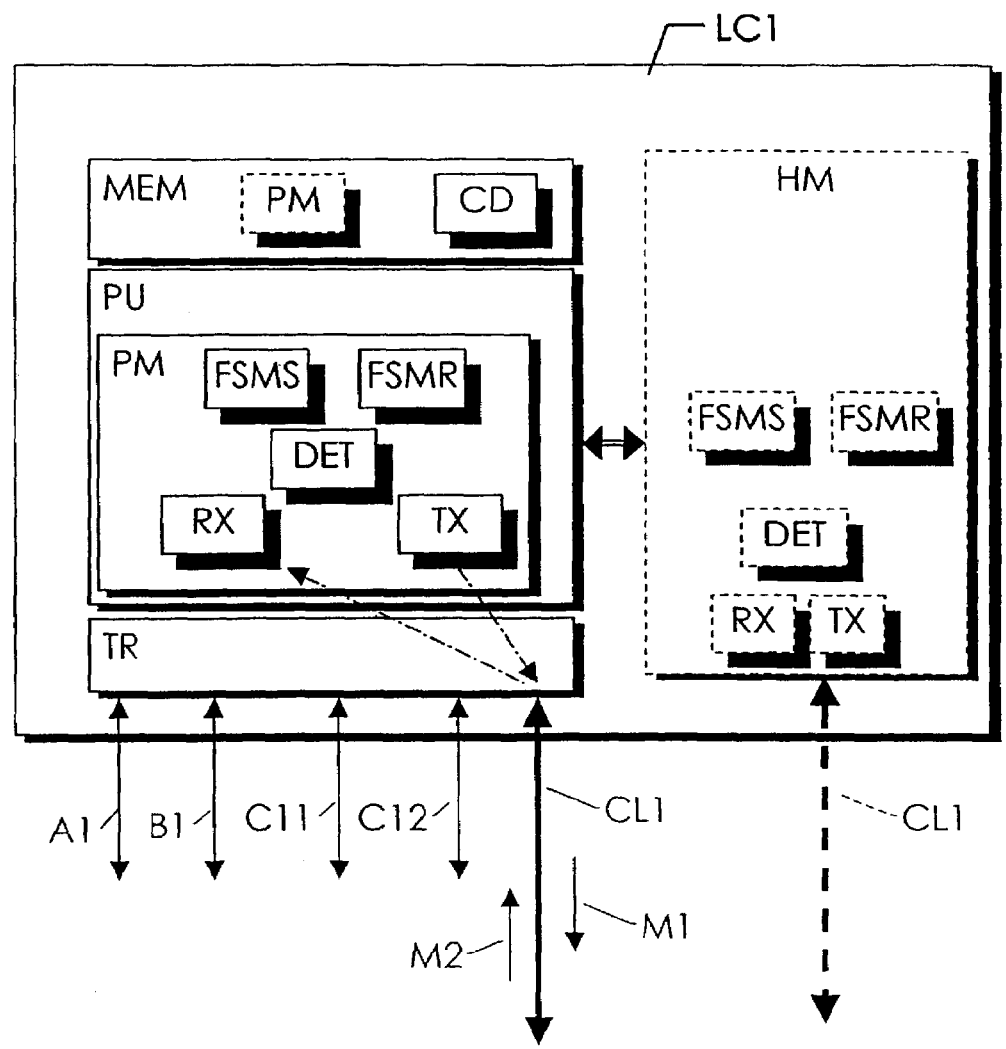
FIG. 5 shows in detail, however very diagrammatically, the controller LC1 and the program module PM according to FIGS. 1 and 4 respectively.
Figure 6:
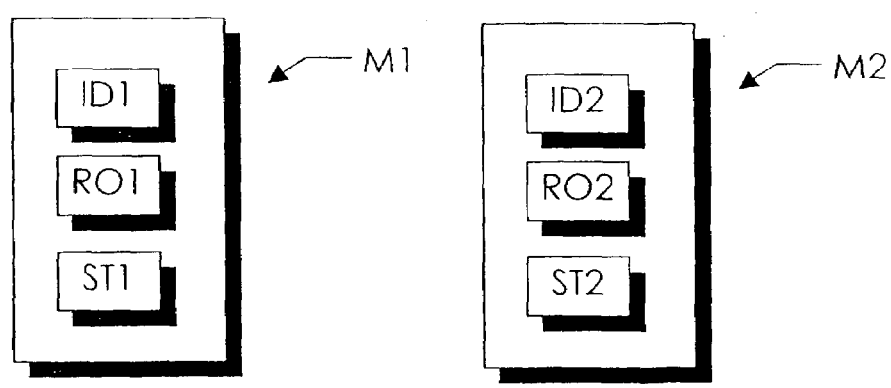
FIG. 6 shows messages M1, M2 sent and received by the controller LC1 according to FIGS. 1 and 5.

For simplification the controllers CC1, CC2, LC1 to LC5 are of similar design and only diagrammatically depicted as block diagrams of functions. Each controller CC1, CC2, LC1 to LC5 may be an integrated circuit and/or contain a printed circuit board. FIG. 5 shows, e.g., a block diagram for the controller LC1 that may also represent the controllers CC1, CC2, LC2 to LC5. The controller LC1 possesses connecting means TR for the transmission and reception of data, e.g., via the connections A1, B1, C11, C12 and CL1. The connecting means TR for example may comprise a bus interface, an Ethernet board, a modem or the like. Furthermore the controller LC1 possesses control means PU ("processing unit") and memory means MEM that are connected with each other and with the connecting means TR by connections, which are not illustrated. The control means PU are for example processors or processor arrays with which a program code of program modules may be executed, which are stored in memory means MEM, for example program code of a program module PM according to the invention. In order to be executed the program module PM is loaded from the memory means MEM into the control means PU. The memory means MEM are for instance in the form of flash memory modules and/or RAM modules. Furthermore the controller LC1 may have display means as for example light emitting Diodes (LED), an LCD (liquid crystal display) or the like. Input means, for example a keyboard and/or a computer mouse, may be connected with the controller LC1. The controller LC1 is run by an operating system as for instance a real time operating system (RTOS) or Unix.

Figure 2:
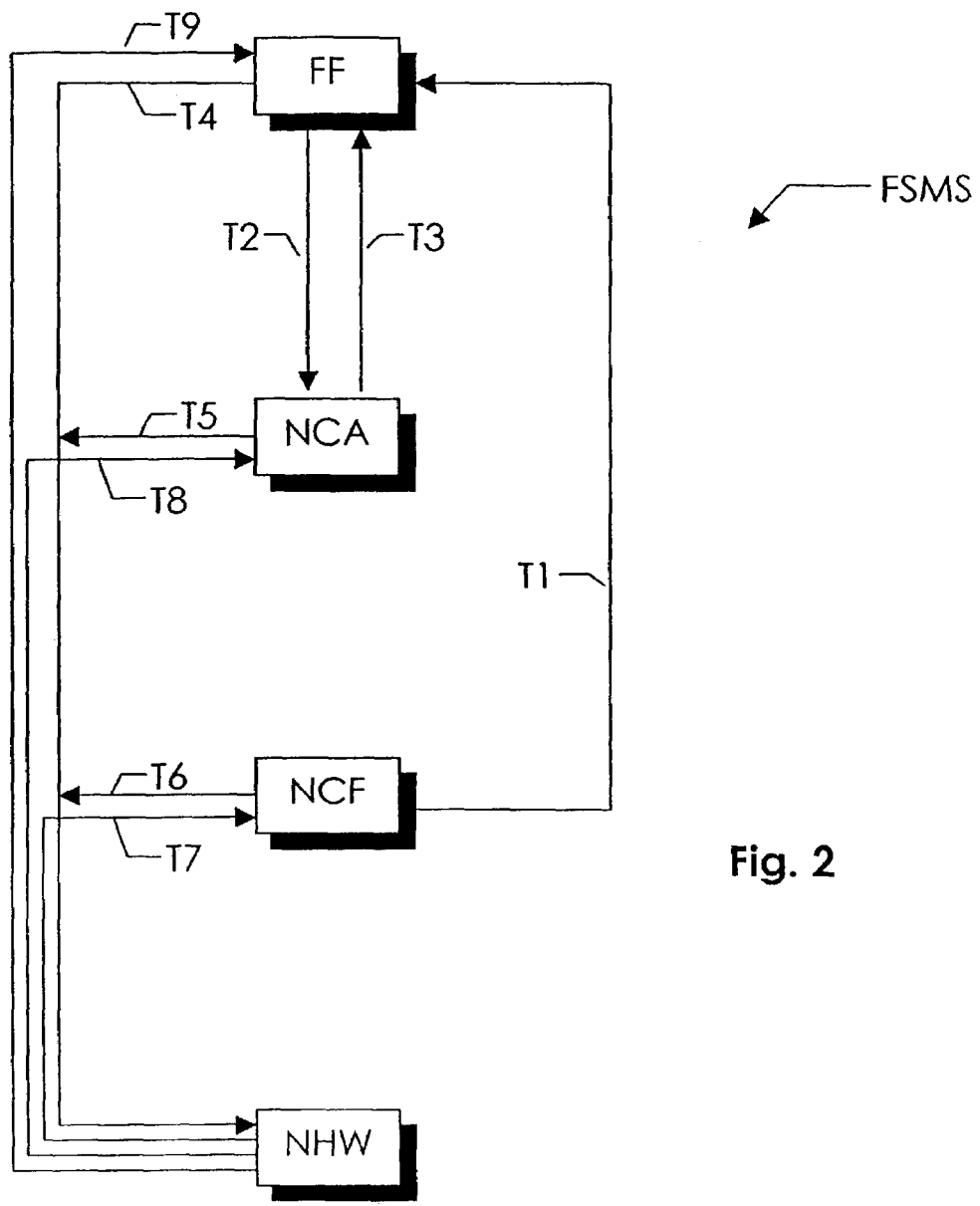
FIG. 2 shows a finite state machine FSMS run by the controllers CC1, CC2, LC1 to LC5 and containing states representing the operability states of the aforementioned controllers.
Figure 3:
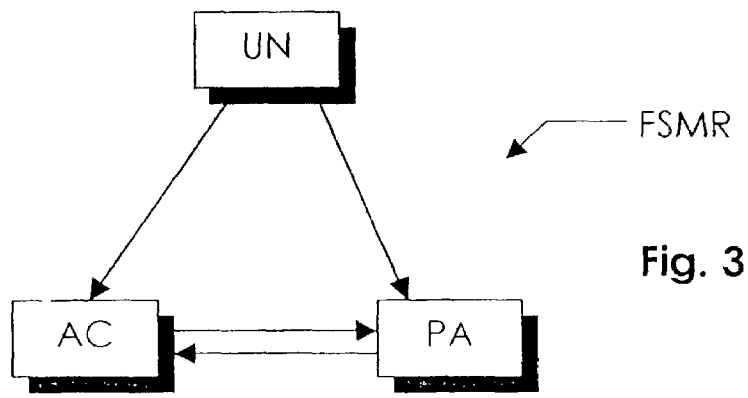
FIG. 3 shows a finite state machine FSMR also run by the controllers CC1, CC2, LC1 to LC5. The states of the finite state machine FSMR represent in contrast to the finite state machine FSMS the respective roles of the aforementioned controllers.

The program module PM contains in the present embodiment sending means TX and receiving means RX for sending data to and receiving data from the redundant controller LC2. The transmission means RX, TX may be also suited to communicate with the superordinated controller CC1, CC2. The program module PM contains also a determination means DET. The function of the means DET will be described in detail. Furthermore the program module PM contains and/or represents and/or runs finite state machines FSMS and FSMR. The states of the machine FSMS represent the operability states and the states of the machine FSMR represent the role of the controller LC1 (see FIGS. 2 and 3). The program module PM may be encoded in various programming languages. By carrying out the program code of the program module PM the controller LC1 performs the steps of a method according to the invention.

Basically the controllers CC1, CC2, LC2 to LC5 may be equipped with the program module PM and perform consequently the same or similar steps as described below.

The machine FSMS has in the present embodiment for example four different states NHW, NCF, NCA, and FF representing respective operability states of the controller LC1. The program module PM detects the respective operability state preferably in cooperation with the operating system and/or other (not shown) program modules and/or means of the controller LC1, for example in cooperation with the connecting means TR.

The states NHW, NCF, NCA, FF may be interpreted with:
FF="fully functional". This is the best state in which the functionality of the controller is not limited. In this state the controller LC1 has received configuration data CD from the active one of the controllers CC1, CC2. Consequently the communication with the active controller CC1, CC2 is not disturbed. Furthermore, the controller LC1 can access and is able to control the hardware equipment H1.
NCA="no central controller access". In this state the controller LC1 is functional for stand-alone operation, i.e.

basically able to control the hardware equipment H1. The controller LC1 has already received the configuration data CD. The connections A1 and/or B1 with the superordinated controllers CC1, CC2, at least the connection A1 or B1 with the respective active controller CC1, CC2, is/are however disturbed, e.g. due to a broken LAN cable.

NCF="not configured". The controller LC1 is in this state right after its system start when it has still not received the configuration data CD from the active one of the controllers CC1, CC2. In the state NCF the controller LC1 is basically able to access and/or control the hardware equipment H1. It might be the case that even if the controller LC1 has not received the configuration data CD it is able to run the hardware equipment H1 according to basic configuration data (not shown) that is permanently stored in the memory means MEM.

NHW="no hardware access". This is the worst state in which the controller LC1 has no access to the hardware equipment H1.

More or less states than the states NHW, NCF, NCA, and FF are possible. For example in addition to the state NCA further states "no access to controller CC1" and "no access to controller CC2" could be defined.

The states NHW, NCF, NCA, FF represent the operability states of the controller LC1 in an ascending order. In the present embodiment the values 1 to 4 are assigned to the states NHW, NCF, NCA, FF. Thus, a higher value of the operability state parameter represents a better ability of the controller LC1 to perform its functionality.

The finite state machine FSMS (FIG. 2) works as follows. The initial state of the controller LC1 is the state NCF. As the connections to both the hardware equipment H1 and at least the active one of the controllers CC1, CC2 are usually fully operational, the controller LC1 receives the configuration data CD, finalizes its system start routines and switches in a transition T1 to the state FF.

If the connections A1 and/or B1 to the superordinated controllers CC1, CC2 are lost, the controller LC1 changes in a transition T2 to the state NCA. After reestablishing the connections A1 and/or B1 the controller LC1 changes in a transition T3 to the state FF.

If the controller LC1 looses at least partly the access to the hardware equipment H1 it changes from each of the states FF, NCA, NCF to the state NHW (transitions T4, T5, T6). In the opposite direction, the controller LC1 changes form the state NHW in the best possible state NCF, NCA, FF via transitions T7, T8, T9 if the access to the hardware equipment H1 is recovered.

The finite state machine FSMR (FIG. 3) works as follows. The initial role of the machine FSMR is the role UN that is for example "undecided". Depending on the ability of the controller LC1 to perform its functionality in comparison with the respective operability of the controller LC2 the machine FSMR switches to one of the roles AC (=active) or PA (=passive). If the relation of the operability states of the controllers LC1, LC2 changes, the controllers LC1, LC2 also change their respective roles AC or PA.

In the present embodiment the controllers LC1, LC2 mutually transmit messages M1, M2. The controller LC1 sends for example the message M1 to the controller LC2 and receives the message M2 from the controller LC2. The message M1 contains for example an operability state parameter ST1 representing the respective operability state of the controller LC1, e.g. NHW, NCF, NCA or FF, an information RO1 about the role of the controller LC1, e.g. UN, AC or PA, and an identifier ID1 uniquely identifying the controller LC1. The identifier ID1 could also be called a tag. The identifier ID1 may be e.g. derived from a hardware feature of the controller LC1 such as its hardware address, a unique serial number or the like.

The identifier ID1 is in the present embodiment of the invention used to both to identify the controller LC1 and to resolve active/active and passive/passive role conflicts between the controllers LC1, LC2 which will be explained later.

The message M2 contains a triple ST2, RO2, ID2 representing the operability state, role and identification of the controller LC2 accordingly.

The operability state parameters ST1, ST2 may obtain the values 1 to 4 assigned to the states NHW, NCF, NCA, and FF. The role information RO1, RO2 may have values 1 to 3 assigned to the roles UN, PA, AC. The values of the identifier ID1, ID2 are for example 1 and 2.

The messages M1 and M2 are for example sent at the system start of the controllers LC1, LC2 and/or if a hardware component of the hardware equipment H1 is removed or input and/or if the state of the connections A1, A2, B1, B2 between the controllers LC1, LC2 and the superordinated controllers CC1 and/or CC2 changes (e.g. due to communication problems or the like) and/or if the state of the connections C11, C12, C21, C22 between the controllers LC1, LC2 and the hardware equipment H1 changes. The controllers LC1, LC2 may also periodically and/or at random times or at any other time condition send the messages M1 and M2.

Figure 4:
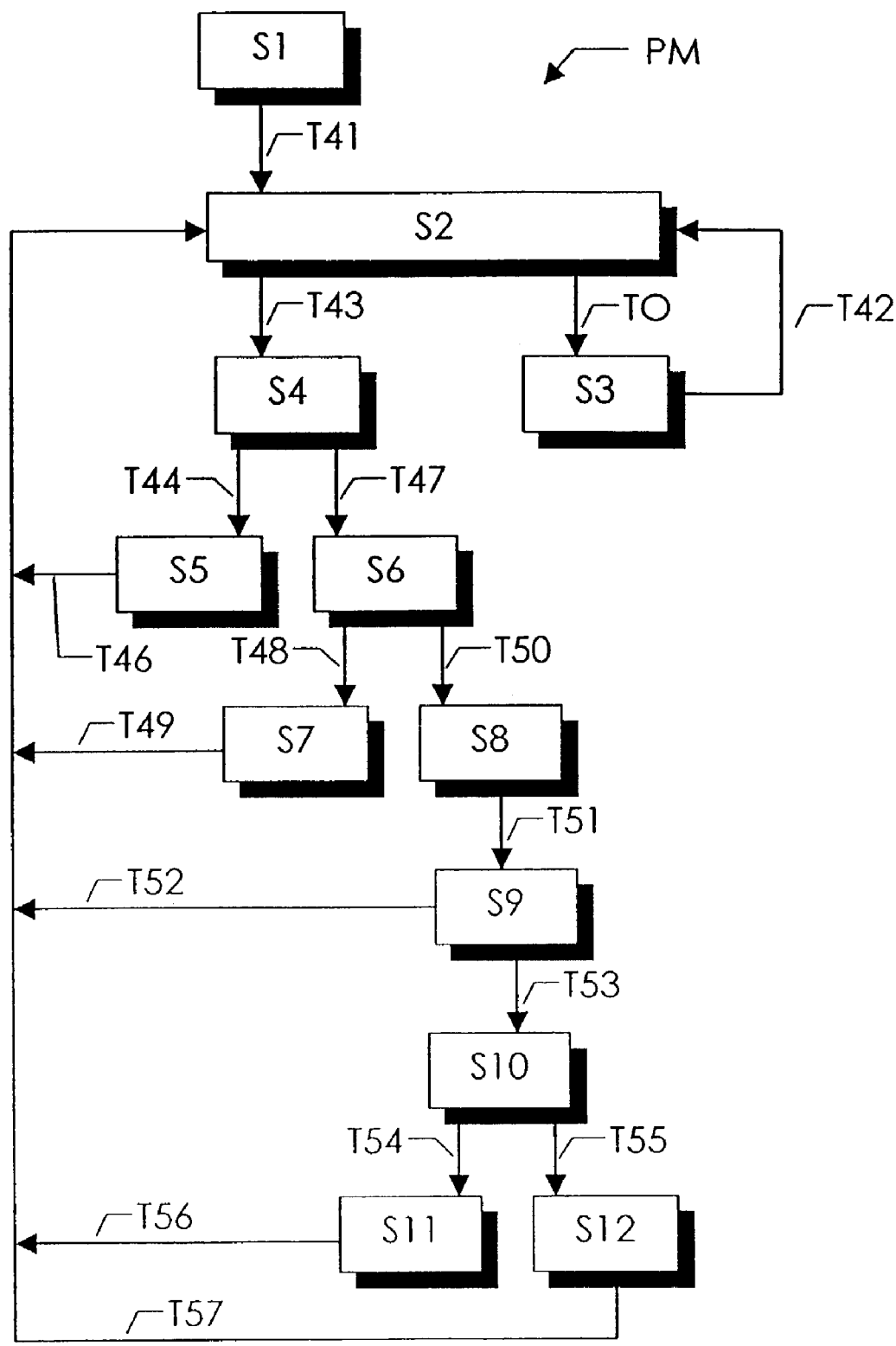
FIG. 4 shows a program flow chart of a program module PM run by the controllers CC1, CC2, LC1 to LC5.

The program flow chart of FIG. 4 shows a possible flow according to which the program module PM, i.e. the determination means or function DET, changes between the roles UN, PA, AC depending on, inter alia, the operability states NHW, NCF, NCA, FF.

The chart of FIG. 4 represents a possible embodiment of the following rules:

If a controller is in the role undecided (UN), it changes to the role active (AC) or passive (PA) after it has received at least the operability state parameter, preferably the complete triple comprising the operability state parameter, the role and the identifier, from each other controller. This is done according to the following further rules.

A controller plays an active role (AC) if all controllers have an operability state indicating a lower ability to perform their respective functionality.

A controller changes to the passive role (PA) if any other controller has an operability state indicating a higher ability to perform its functionality.

If two or more controllers are equally able to play the active role (AC), only the one with the highest identifier (tag) value remains active (AC), all other controllers change to the passive role (PA). By this rule active/active role conflicts are resolved.

If no controller is in the active role, the controller with the highest identifier (tag) value becomes active; all other controllers change to or remain in the passive role. This resolves all passive/passive role conflicts and facilitates the initial transition from the role undecided.

A controller does not change its role if there are other controllers with the same operability state level, and there is no active/active or passive/passive conflict.

Explanation of the chart of FIG. 4:

In a start step S1 the program module PM adopts the role UN. Then it moves (see arrow T41) to a step S2 in which it waits for a message from a redundant controller. The program modules PM of the controller LC1, LC2 wait for the messages M2, M1 respectively.

If the program module PM does not receive the respective message M1, M2 it adopts after a timeout TO the role AC (=step S3) and moves subsequently back (see arrow T42) to the step S2 waiting aging for a possible message M1, M2 containing a triple ST1, RO1, ID1 or ST2, RO2, ID2 from the respective redundant controller LC1, LC2.

The time of the timeout TO is preferably longer than the periods between the usual transmission of the messages M1, M2.

The following description refers only to the program module PM of the controller LC1.

If the preferably secure and reliable communication between the controllers LC1 and LC2 is not disturbed and the controller LC2 works properly, the program module PM receives the message M2 and moves shown by an arrow T43 to a step S4.

In the step S4 the program module PM compares the operability state of the controller LC1 with the current operability state of the controller LC2. To this end, the program module PM compares the values of the respective operability state parameters ST1 and ST2. In the step S4 the program module PM asks the question "Is the local operability state better than the operability state of remote (redundant) controller(s)?" or in the present embodiment "Is the local operability state, the operability state of the controller LC1, better than the operability state of remote (redundant) controller(s), the operability state of controller LC2?" If the answer is "Yes", the program module PM moves (shown by an arrow T44) to a step S5 in which it adopts the active role AC. The program module PM may in step S4 compare the values of the operability state parameters ST1, ST2. A higher value represents for example a better operability state of the respective controller LC1, LC2. After performing step S5 the program module PM moves back via arrow T46 to step S2 and waits again for an operability state information from the controller LC2.

If however the answer to the question of step S4 is "No", in other words, if the operability state of the controller LC1 is equal to or worse than the operability state of the controller LC2, the program module PM moves (shown by an arrow T47) to a step S6. In the step S6 the program module PM asks the question "Is the local operability state worse than the operability state of remote (redundant) controller(s)?" in other words, "Is the operability state of controller LC1 worse than the operability state of the controller LC2?" If the answer is "yes", the program module PM moves (shown by an arrow T48) to a step S7 in which it adopts the passive role PA. From step S7 the program module PM moves illustrated by an arrow T49 back to step S2 and waits for a message from the controller LC2.

If however the answer to the question of step S6 is "No", the operability states of the controllers LC1, LC2 are equal. Then, the program module PM moves (shown by an arrow T50) to a step S8 in which it adopts either the active role AC or the passive role PA if the current role of the controller LC1 is still the undetermined role UN. Thus, an initial role transition from undetermined to either active or passive is performed. If the current role prior to step S8 is already AC or PA, the program module PM does not change the respective role in step S8.

From step S8 the program module PM moves (via arrow T51) to a step S9 in which it checks the respective roles of the controllers LC1, LC2. To this end, the program module PM may compare the values of the information RO1 and RO2. If the local role of the controller LC1 is not equal to the remote role of the controller LC2, so to speak "local role not equal to remote role", the respective roles remain unchanged. Consequently, the program module PM loops back via arrow T52 to step S2.

If however the roles of the redundant controllers LC1, LC2 are equal (active-active or passive-passive conflict) the program module PM moves (shown by an arrow T53) to a step S10 in which it evaluates the identifiers or tags ID1, ID2. If e.g. the value of the (local) identifier ID1 is higher than the value of the (remote) identifier ID2, the program module PM moves (see arrow T54) to a step S11 in which it adopts the active role AC. Otherwise, the program module PM moves (see arrow T55) to a step S12 in which it adopts the passive role PA. From steps S11 and S12 the program module PM moves back to the step S2 (see arrows T56 and T57 respectively).

After determining the respective role AC or PA the program module PM instructs the controller LC1 to play the respective role. The program module PM instructs, e.g., the connecting means TR to not send commands to the hardware equipment H1 if the controller LC1 is in the passive role.

The controllers CC1 and CC2 as well as the controllers LC3 to LC4 may negotiate their respective active or passive role accordingly. Thus, the active-passive role assignment is negotiated on the same hierarchical level respectively. A coordinating aid of a superordinated control means is not needed. In other words, the controllers LC1, LC2 would be able to negotiate their respective active or passive role according to the invention even if there were no superordinated controllers CC1, CC2.

Even if the above explained "software" solution is a preferred embodiment of the invention, a more or less "hardware" oriented embodiment of the invention is also possible. In addition to the program module PM or instead of it the controller LC1 may for example contain a hardware module HM according to the invention. The module HM provides basically the same functionality as the program module PM, i.e. performs the steps of a method according to the invention. The module HM contains for example means RXH, TXH, DETH, FSMSH and FSMRH that are similar—at least in view of the respective functions—to the means RX, TX, DET, FSMS and FSMR of the program module PM. The module HM may be for example an integrated circuit or "chip" separate from the controller LC1. An integrated solution, e.g. a one-chip-solution or a one-printed-circuit-board-solution, are however preferred in which the module HM forms an integral part of the controller LC1. The module HM might be for example an ASIC (Application Specific Integrated Circuit).

It is however possible to provide a combined hardware-software solution. A modified hardware module HM could for example comprise (hardware) only means RXH, TXH, DETH cooperating with means FSMS and FSMR of a modified program module PM (without means RX, TX, DET).

The invention claimed is:

1. A method of negotiating an active or a passive role assignment to a first control means and to at least one second control means, both contained in a single network element, said first control means and said at least one second control means being redundant and operating dependent in a role that is active or passive with regard to controlling said network element, the method comprising the steps of:

determining an operability state parameter for each of said first control means and said at least one second control means dependent on the respective ability of said first control means and said at least one second control means to perform a first functionality and a second functionality, respectively;

mutually transmitting said operability state parameters between said first control means and said at least one second control means; and determining an active role or a passive role by said first control means and by said at least one second control means dependent on said operability state parameter of the first control means and said operability state parameter of said at least one second control means;

wherein when a control means is assigned a passive role, it is in stand-by with regard to the controlled network element; and when a control means is assigned an active role, it controls the controlled network element.

2. The method as claimed in claim 1, wherein said first control means assigns the active role to the first control means if said operability state of the first control means is better than the operability state of said at least one second control means, and wherein said at least one second control means assigns the passive role to said at least one second control means if said operability state of said at least one second control means is worse than the operability state of said first control means.

3. The method as claimed in claim 1, wherein values of a predetermined order are assigned to said operability state parameter of the first control means and said operability state parameter of the at least one second control means, said values representing the ability level of said first control means and said at least one second control means to perform the first functionality and the second functionality, respectively.

4. The method as claimed in claim 3, wherein said first control means compares the value of operability state parameter of the first control means with the value of the operability state parameter of said at least one second control means to determine whether to play the active role or the passive role.

5. The method as claimed in claim 1, wherein a unique identifier is assigned to each of said first control means and said at least one second control means, and wherein said unique identifiers are mutually transmitted between said first control means and said at least one second control means.

6. The method as claimed in claim 5, wherein said unique identifiers, and a value of the unique identifiers, are evaluated to determine the active role for said first control means and the passive role for said at least one second control means or vice versa to resolve at least one of an active-active role conflict and a passive-passive role conflict between said first control means and said at least one second control means.

7. The method as claimed in claim 6, wherein said first control means changes from the active role to the passive role if the unique identifier of the first control means has a higher or a lower value than the unique identifier of said at least one second control means and if at least one of the operability state of the first control means and the operability state of said at least one second control means and roles of said first control means and said at least one second control means are equal.

8. The method as claimed in claim 6, wherein if said first control means and said at least one second control means are not in the active role, at least one of the first control means and the at least one second control means with the highest or the lowest unique identifier value becomes active and the first control means or at least one second control means changes to or remains in the passive role.

9. The method as claimed in claim 1, wherein said first control means assumes that said at least one second control means plays a passive role if said first control means does not receive the operability state parameter of said at least one second control means.

10. The method as claimed in claim 1, wherein information about the respective roles of said control means is mutually transmitted between said control means.

11. The method as claimed in claim 10, wherein said first control means remains in a current role, passive or active, if a role of said at least one second control means is different from said current role and if the operability state of the first control means and the operability state of the at least one second control means are equal.

12. The method as claimed in claim 1, wherein in addition to said active or passive role an undetermined role is defined, said undetermined role being the initial role of said first control means and said at least one second control means, at a first system start and a second system start.

13. The method as claimed in claim 12, wherein said first control means changes from the undetermined role to the active or the passive role after receiving the operability state parameter of said at least one second control means.

14. The method as claimed in claim 1, wherein said first control means transmits the operability state parameter of the first control means and the unique identifier of the first control means and an information about the role of the first control means within one common message to said at least one second control means.

15. The method as claimed in claim 1, wherein said first control means and said at least one second control means transmits said state parameter, said unique identifier and said information about the role, periodically and at a first system start and a second system start.

16. The method as claimed in claim 1, wherein said first control means and said at least one second control means performs at least one finite state machine to determine the active or the passive role, and said operability state of said first control means and said operability state of said at least one second control means represents he respective states of said at least one finite state machine and said active, passive and undetermined roles represent the respective states of said at least one finite state machine.

17. The method as claimed in claim 1, wherein said first control means and said at least one second control means control at least one common hardware device, especially contained in one rack of said network element, and in that said at least one common hardware device is actively controlled by said first control means if said first control means plays an active role or by said at least one second control means if said at least one second control means plays an active role.

18. A first control means of a single network element able to negotiate an active or a passive role assignment with at least one second control means, wherein said first control means and said at least one second control means are contained in said single network element, said first control means and said at least one second control means being redundant and operating dependent on a role that is active or passive with regard to controlling said network element, said first control means comprising means for carrying out a method comprising:

determining a first operability state parameter dependent on the ability of said first control means to perform a functionality;

transmitting said first operability state parameter to said at least one second control means;

receiving at least one second operability state parameter of said at least one second control means; and determining an active role or a passive role dependent on said first operability state parameter and said at least one second operability state parameter;

wherein when a control means is assigned a passive role, it is in stand-by with regard to the controlled network element; and when a control means is assigned an active role, it controls the controlled network element.

19. A program module for a first control means of a single network element, said program module enabling said first control means to negotiate an active or a passive role assignment with at least one second control means, wherein said first control means and said at least one second control means are contained in said single network element, said first control means and said at least one second control means being redundant and operating dependent on a role that is active or passive with regard to controlling said network element, said program module containing program instructions able to be executed by said first control means, said instructions comprising the steps of:

determining a first operability state parameter dependent on the ability of said first control means to perform its functionality;

transmitting said first operability state parameter to said at least one second control means;

receiving at least one second operability state parameter of said at least one second control means; and determining the active role or the passive role dependent on said first operability state parameter and said at least one second operability state parameter;

wherein when a control means is assigned a passive role, it is in stand-by with regard to the controlled network element; and when a control means is assigned an active role, it controls the controlled network element.

20. A single network element containing a first control means and at least one second control means negotiating an active role or a passive role assignment, said first control means and said at least one second control means being redundant and operating dependent on a role that is active or passive with regard to controlling said network element, said first control means and said at least one second control means adapted to carry out:

determining of operability state parameters for said first control means and said at least one second control means dependent on an ability of said first control means and said at least one second control means to perform a first functionality and a second functionality, respectively;

mutually transmitting said first operability state parameter and said second operability state parameter between said first control means and said at least one second control means; and determining the active role or the passive role by said first control means and by said at least one second control means dependent on said first operability state parameter and said second operability state parameter;

wherein when a control means is assigned a passive role, it is in stand-by with regard to the controlled network element; and when a control means is assigned an active role, it controls the controlled network element.

21. A computer readable medium having a program module for a first control means of a single network element, said program module enabling said first control means to negotiate an active or a passive role assignment with at least one second control means wherein said first control means and said at least one second control means are contained in said single network element, said first control means and said at least one second control means being redundant and operating dependent on a role that is active or passive with regard to controlling said network element, said program module containing program instructions able to be executed by said first control means, and said instructions comprising the steps of:

determining a first operability state parameter dependent on the ability of said first control means to perform its functionality;

transmitting said first operability state parameter to said at least one second control means;

receiving at least one second operability state parameter of said at least one second control means; and determining the active role or the passive role dependent on said first operability state parameter and said at least one second operability state parameters;

wherein when a control means is assigned a passive role, it is in stand-by with regard to the controlled network element; and when a control means is assigned an active role, it controls the controlled network element.

22. The method according to claim 1, wherein the active role comprises actively controlling the first functionality of a device, and the passive role comprises being in a stand-by mode with respect to controlling the first functionality of the device.

23. The method according to claim 1, wherein the first functionality and the second functionality are different functions of a single device.

24. The method according to claim 23, wherein if the first control means is in the active role with respect to the first functionality of the device, then the at least one second control means is in a second active role with respect to the second functionality of the device.

* * * * *